United States Patent
Guthrie et al.

(10) Patent No.: US 10,408,574 B2
(45) Date of Patent: Sep. 10, 2019

(54) COMPACT LASER AND GEOLOCATING TARGETING SYSTEM

(71) Applicant: THE BOEING COMPANY, Chicago, IL (US)

(72) Inventors: Richard B. Guthrie, Orlando, FL (US); Ivan A. Cintron, Orlando, FL (US)

(73) Assignee: THE BOEING COMPANY, Chicago, IL (US)

( * ) Notice: Subject to any disclaimer, the term of this patent is extended or adjusted under 35 U.S.C. 154(b) by 94 days.

(21) Appl. No.: 15/246,127

(22) Filed: Aug. 24, 2016

(65) Prior Publication Data

US 2018/0058814 A1    Mar. 1, 2018

(51) Int. Cl.
| | |
|---|---|
| *F41G 3/14* | (2006.01) |
| *F41G 3/16* | (2006.01) |
| *G01S 19/18* | (2010.01) |
| *F41G 3/02* | (2006.01) |
| *F41G 3/06* | (2006.01) |
| *G01S 5/16* | (2006.01) |
| *F41G 3/04* | (2006.01) |
| *F41G 9/00* | (2006.01) |

(52) U.S. Cl.
CPC .............. *F41G 3/145* (2013.01); *F41G 3/02* (2013.01); *F41G 3/06* (2013.01); *F41G 3/165* (2013.01); *G01S 5/163* (2013.01); *G01S 19/18* (2013.01); *F41G 3/04* (2013.01); *F41G 9/00* (2013.01)

(58) Field of Classification Search
None
See application file for complete search history.

(56) References Cited

U.S. PATENT DOCUMENTS

| | | | | |
|---|---|---|---|---|
| 8,848,203 B2 * | 9/2014 | Bridges | ............... | G01C 15/002 356/614 |
| 8,902,408 B2 * | 12/2014 | Bridges | ............... | G01C 15/002 342/118 |
| 9,372,070 B1 * | 6/2016 | Jancic | .................. | G01B 11/026 |
| 2009/0100995 A1 * | 4/2009 | Fisher | ..................... | B64D 1/04 89/1.11 |
| 2009/0225299 A1 * | 9/2009 | Crawford | ................. | G01C 3/08 356/4.07 |
| 2014/0240689 A1 * | 8/2014 | Arbouzov | ............ | G01S 17/023 356/4.01 |
| 2015/0276355 A1 * | 10/2015 | Komukai | ................ | F41H 11/00 89/1.11 |
| 2016/0097857 A1 * | 4/2016 | Gokay | ..................... | F41G 3/06 356/5.01 |

* cited by examiner

*Primary Examiner* — Chikaodili E Anyikire
(74) *Attorney, Agent, or Firm* — Patterson + Sheridan, LLP (57) ABSTRACT

A handheld targeting device that includes a geolocating system and a laser targeting system is provided. The geolocating system includes a laser range finder operable to emit a first pulsed laser beam toward an object from the first end of the housing and receive a returned first pulsed laser beam to calculate a distance to a target. By combining the calculated distance with a compass direction and position of the targeting device, a location of the object can be calculated. The laser targeting system includes a laser targeting marker operable to emit a second pulsed laser beam toward the object from the first end of the housing. Other vehicles or weapons can detect the second pulsed laser beam for indication of or guidance to the target. In one aspect, the laser range finder can share an optical lens with a thermal imager that captures infrared images.

36 Claims, 4 Drawing Sheets

COMPACT LASER AND GEOLOCATING TARGETING SYSTEM

GOVERNMENT SUPPORT

This invention was made with Government support under FA8629-12-C-2421 awarded by Department of Defense. The government has certain rights in this invention.

RELATED APPLICATIONS

This application is related to a U.S. application Ser. No. 15/246,057, filed Aug. 24, 2016, the entire contents of which are incorporated herein.

BACKGROUND

Aspects described herein provide a compact (e.g., hand-holdable) targeting device that can provide laser targeting capabilities and remote geolocation capabilities in a single device. Soldiers or other ground personnel sometimes provide targeting support for aircraft, other vehicles, weapons, or other soldiers. For example, personnel may use laser targeting devices that illuminate a target with a laser spot that a sensor onboard a vehicle and/or a weapon can detect. The sensor uses the laser spot as an indicator of a target for subsequent prosecution, surveillance. For example, a weapon may guide to the laser spot to engage the target. As another example, a weapon may use the laser spot as a guide for its own targeting system. After the weapon targeting system has acquired the target with the laser spot, the weapon targeting system can be used to guide the weapon to the target. As another example, personnel may use geolocation devices that calculate a position of a target and transmit the calculated position (e.g., a latitude and longitude) to a vehicle and/or weapon. The transmitted position is then used for guidance to the target.

The size and weight of existing laser targeting and geolocation devices limit soldiers' flexibility during deployment in the field. A soldier may carry both a laser targeting device and a geolocation device in the field. However, such a load may limit the amount of ammunition and rations the soldier may also carry. As a result, a deployed soldier has limited flexibility in methods for providing targeting information to vehicles and/or weapons.

SUMMARY

According to one aspect, a targeting device comprises a housing. The targeting device also comprises a laser range finder arranged in the housing. The targeting device also comprises a laser targeting marker arranged in the housing. The targeting device also comprises a digital imaging camera arranged in the housing. The targeting device also comprises a first lens configured to transmit visible light to the digital imaging camera. The targeting device also includes a display screen. The targeting device also comprises computer memory in communication with a controller, said computer memory storing a plurality of risk-estimate distances for respective ones of a plurality of munitions and a plurality of locations associated with other entities. The controller is operably connected to the laser range finder, the laser targeting marker, the digital imaging camera and the display screen. The controller is operable to display on the display screen at least one image based on data obtained from the digital imaging camera. The controller is also operable to instruct the laser rangefinder to emit a first pulsed laser beam. The controller is also operable to calculate a location of an object based on the first pulsed laser beam as reflected by the object within a path of the first pulsed laser beam from the laser range finder. The controller is also operable to calculate the distance from the object having reflected the first pulsed laser beam to any of the entity locations stored in the computer memory and compare said distance to the risk-estimate distance stored in the computer memory. The controller is also operable to overlay on the at least one image a graphical indication of the object having reflected the first pulsed laser beam when the calculated location of the object is within a field of view of the digital imaging camera. The controller is also operable to provide an alert if the distance from the object having reflected the first pulsed laser beam is less than the risk-estimate distance from the object to any of the entity locations stored in the computer memory.

According to one aspect, a handheld targeting device comprises a housing. The handheld targeting device also comprises a first lens arranged on the housing and configured to transmit visible light to a digital imaging camera arranged in the housing. The handheld targeting device also comprises a laser range finder arranged in the housing and operable to emit a first pulsed laser beam towards an object. The handheld targeting device also comprises a second lens arranged on the housing and configured to transmit infrared light to a thermal imager arranged in the housing, the second lens further configured to receive a returned first pulsed laser beam reflected by an object in a path of the first pulsed laser beam. The handheld targeting device also comprises a laser targeting marker arranged in the housing and operable to emit a second pulsed laser beam towards an object. The handheld targeting device also comprises a laser spot tracker arranged in the housing and operable to receive a second pulsed laser beam reflected by an object in the path of the second pulsed laser beam. The handheld targeting device also comprises a display screen. The handheld targeting device also comprises a controller arranged in the housing. The controller is operable to display on the display screen at least one image based on data obtained by the digital imaging camera, the thermal imager or a combination of both the digital imaging camera and the thermal imager. The controller is also operable to overlay on the display of the at least one image a graphical indication of an object that has previously reflected the second pulsed laser beam.

According to one aspect, a handheld targeting device comprises a housing that includes a first end and a second end, the housing defining a longitudinal axis between the first and second end. The handheld targeting device also comprises a self-location module arranged in the housing. The handheld targeting device also comprises a digital magnetic compass arranged in the housing. The handheld targeting device also comprises a visible-light digital imaging camera arranged in the housing and operable to receive visible-light images, wherein the visible light digital imaging camera includes a first lens arranged in the first end of the housing, and wherein a first optical axis of the visible-light digital imaging camera is aligned in the housing such that captured visible-light images are aligned along the longitudinal axis. The handheld targeting device also comprises a thermal imager arranged in the housing and operable to capture infrared images within a field of view of a second lens of the thermal imager arranged in the first end of the housing, wherein a second optical axis of the thermal imager is aligned in the housing such that captured infrared-light images are aligned along the longitudinal axis, wherein the second lens is arranged in the first end of the housing. The handheld targeting device also comprises a display screen arranged on the second end of the housing, wherein the display screen is selectively operable to display the captured visible-light images or the captured infrared-light images. The handheld targeting device also comprises a laser range finder arranged in the housing and operable to emit a first pulsed laser beam toward an object from the first end of the housing, receive a returned first pulsed laser beam, and calculate a distance to the object based on a characteristic of the returned pulsed laser beam, wherein the laser rangefinder is aligned in the housing such that the first pulsed laser beam is emitted along the longitudinal axis, wherein the laser rangefinder emits the first pulsed laser beam through a first aperture in the first end of the housing, and wherein the laser rangefinder receives the returned first pulsed laser beam through the second lens arranged in the first end of the housing. The handheld targeting device also comprises a laser targeting marker arranged in the housing and operable to emit a second pulsed laser beam toward the object from the first end of the housing, wherein the laser targeting marker is aligned in the housing such that the second pulsed laser beam is emitted along the longitudinal axis, wherein the laser targeting marker emits the second pulsed laser beam through a second aperture in the first end of the housing. The handheld targeting device also comprises an infrared pointer arranged in the housing and operable to emit an infrared beam, wherein the infrared pointer is aligned in the housing such that the infrared beam is emitted along the longitudinal axis, wherein the infrared pointer emits the infrared beam through a third aperture in the first end of the housing. The handheld targeting device also comprises a laser spot tracker arranged in the housing and operable to receive the second pulsed laser beam emitted by the laser target marker, wherein the laser spot tracker receives the second pulsed laser beam through a fourth aperture in the first end of the housing. The handheld targeting device also comprises a controller arranged in the housing. The controller is operable to display on the display screen one of the visible-light images captured by the visible-light digital imaging camera and the infrared-light images captured by the thermal imager. The controller is also operable to determine a location of an object targeted by the laser range finder by: receiving a location of the housing from the self-location module; receiving a compass direction from the digital magnetic compass when the laser rangefinder emits the first pulsed laser beam; and calculating a location of the object, based on the received location of the housing, the received compass direction, and the calculated distance from the laser rangefinder. The controller is also operable to, after determining the location of the object, overlay on the display of the visible-light image on the display a graphical indication of the object when the calculated location of the object is within the field of view of the digital imaging camera.

According to one aspect, a targeting device comprises a housing that includes a first end and a second end. The targeting device also comprises a self-location module arranged in the housing. The targeting device also comprises a digital magnetic compass arranged in the housing. The targeting device also comprises a laser range finder arranged in the housing. The targeting device also comprises a laser targeting marker arranged in the housing. The targeting device also comprises a digital imaging camera arranged in the housing. The targeting device also comprises a first lens arranged at the first end of the housing and configured to transmit visible light to the digital camera. The targeting device also comprises a display screen arranged at the second end of the housing. The targeting device also comprises computer memory in communication with a controller arranged in the housing. The controller is operable to display on the display screen the visible-light images captured by the digital imaging camera. The controller is also operable to determine a location of an object targeted by the laser range finder by: receiving a location of the housing from the self-location module; receiving a compass direction from the digital magnetic compass when the laser rangefinder emits a first pulsed laser beam; and calculating a location of the object, based on the received location of the housing, the received compass direction, and the calculated distance from the laser rangefinder. The controller is also operable to, after determining the location of the object, overlay on the displayed visible-light image a graphical indication of the object when the calculated location of the object is within the field of view of the digital imaging camera.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In aspects described herein, a single hand-holdable device includes both a laser targeting system and a geolocation targeting system such that a user can flexibly support vehicles and/or weapons to be deployed against various targets. In various aspects, the single hand-holdable device includes additional systems that provide additional capabilities to the user. In one aspect, the device is made compact by combining various physical structures of otherwise disparate systems within the device. For example, in one aspect, a laser rangefinder for the geolocation targeting system can share an optical lens with a thermal imaging system. At least one aspect, the combination of the laser targeting system and geolocation targeting system provides the soldier with a user interface in which the user can store location information for geolocated targets and display the stored location information on the display screen such that the soldier can quickly target the stored locations using the laser targeting system. Additionally, the described aspects enable the soldier to switch between methods of target locating based on potentially changing capabilities of the vehicles and/or weapons.

Figure 1A:
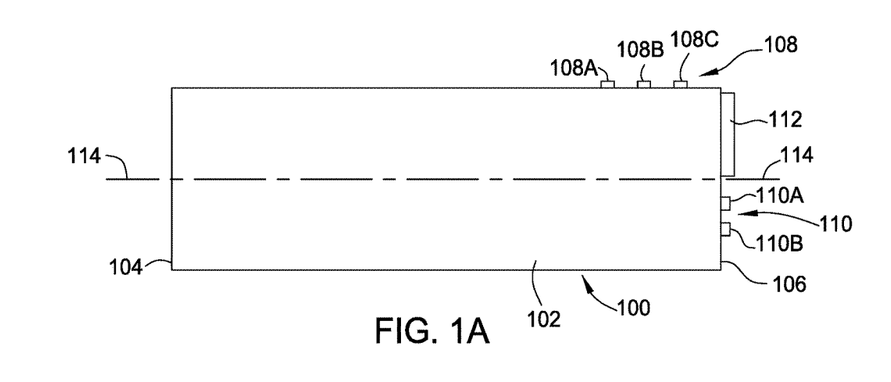
FIG. 1A is a side view of a handheld laser targeting device according to one aspect.
Figure 1B:
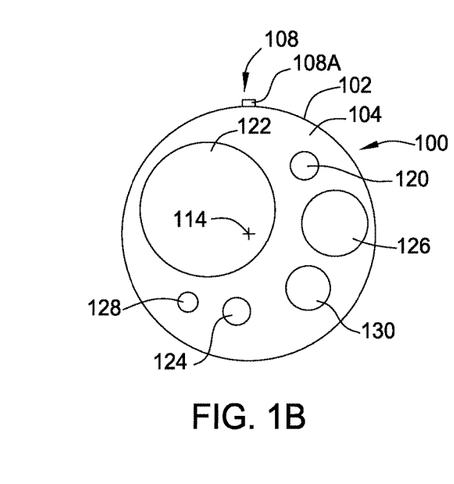
FIG. 1B is a first end view of the handheld laser targeting device of FIG. 1A.
Figure 1C:
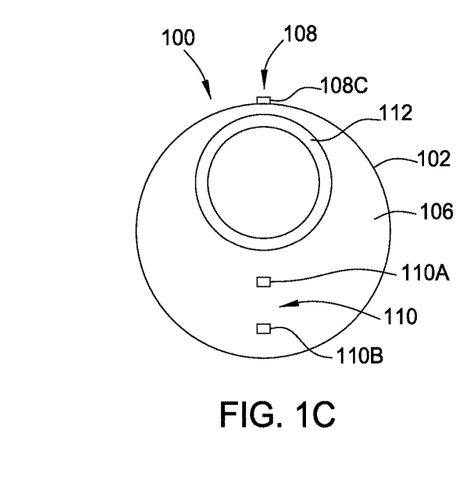
FIG. 1C is a second end view of the handheld laser targeting device of FIG. 1A.

FIGS. 1A-1C (a side view, first end view, and second end view, respectively) illustrate a handheld targeting device 100 that includes a housing 102, a first end 104, and an opposing second end 106. In at least one aspect, the housing 102 is cylindrical with a diameter of approximately three and a half inches and a length between the first end 104 and the second end 106 of approximately nine inches. In other aspects, the housing 102 could have different shapes and dimensions. The housing 102 defines a longitudinal axis 114 between the first end 104 and the second end 106. The first end 104 of the housing 102 includes various lenses and apertures arranged therein for various systems, described in greater detail below. For example, in the aspect illustrated in FIGS. 1A-1C, the first end 104 includes a first lens 120 and a second lens 122 that receive and resolve optical information. As used herein, the term "lens" includes any additional structures, such as iris diaphragms, beam splitters, filters, and coatings, that work in conjunction with the lens to resolve received optical information. The first end 104 also includes a first aperture 124, a second aperture 126, a third aperture 128, and a fourth aperture 130 through which various wavelengths of light (e.g., laser light at different wavelengths and/or infrared light) can be emitted and/or received.

The optical axes of the first lens 120 and the second lens 122 are aligned with the longitudinal axis 114. For example, in one aspect, the optical axes of the first lens 120 and the second lens 122 are substantially parallel with the longitudinal axis 114 such that the first and second lenses 120 and 122 are aligned in the same direction as the longitudinal axis 114 of the housing 102. In such an aspect, centers of images resolved by the first lens 120 and the second lens 122 may be offset slightly from the longitudinal axis 114. However, such an offset of a few centimeters would be insignificant in parallax angle at the typical operating distances for such a handheld targeting device 100 (e.g., hundreds or thousands of meters). As another example, in one aspect, the optical axes of the first lens 120 and the second lens 122 are slightly angled with respect to the longitudinal axis 114 such that the optical axes of the first lens 120 and the second lens 122 intersect the longitudinal axis 114 at a distance along the longitudinal axis 114 away from the first end 104 of the housing 102. For example, in one aspect, the optical axes of the first lens 120 and the second lens 122 could be set at an angle such that the optical axes intersect the longitudinal axis 114 at a distance of one hundred meters or one thousand meters. As another example, in one aspect, the angles of the optical axes of the first lens 120 and the second lens 122 relative to the longitudinal axis 114 could be adjustable by a user. As yet another example, in one aspect, the angles of the optical axes of the first lens 120 and the second lens 122 could be automatically adjusted to intersect the longitudinal axis 114 at a detected distance to a target (e.g., to a detected focusing distance of the first lens 120 and/or the second lens 122).

The second end 106 of the housing 104 includes a display 112 that can display visible images detected by the handheld targeting device 100, targeting information derived from target locations by the handheld targeting device 100 or by other devices, and user interface information. In at least one aspect, the handheld targeting device 100 includes a thermal imaging camera, and the display 112 can display a visible light rendering of thermal imaging data captured by the thermal imaging camera. As illustrated in FIGS. 1A-1C, the display 112 could be recessed within the housing such that a user views the display through an eye cup. In other aspects, the display 112 could be mounted on the second end 106 of the housing 102. In one aspect, the display 112 comprises an active matrix organic light emitting diode (AMOLED) display having a resolution of 1,280 pixels by 720 pixels. The display 112 can include optics (e.g., lenses arranged in front of the display 112) that allow for magnification of images generated by the display 112 and/or that allow for diopter adjustment to accommodate eyesight deficiencies of certain users (e.g., nearsightedness and/or farsightedness).

The housing 102 also supports various user inputs that an operator (e.g., a soldier) can actuate to switch operation modes of the handheld targeting device 100, activate/deactivate various systems in the handheld targeting device 100, and perform various other control operations. In the exemplary handheld targeting device 100 illustrated in FIGS. 1A-1C, a first user input 108 is arranged on the cylindrical housing 102. The first user input 108 includes a first button 108A, a second button 108B, and a third button 108C. The exemplary handheld targeting device 100 illustrated in FIGS. 1A-1C also includes a second user input 110 arranged on the second end 106 of the housing 102. The second user input 110 includes a first button 110A and a second button 110B. In at least one aspect, the user inputs 108 and 110 could include two-position switches, three-position switches, knobs, dials, or other types of user input. In at least one aspect, one or more of the user inputs 108 and 110 could include a five-way switch (e.g., movable up, down, left, right, and pushable).

Figure 2:
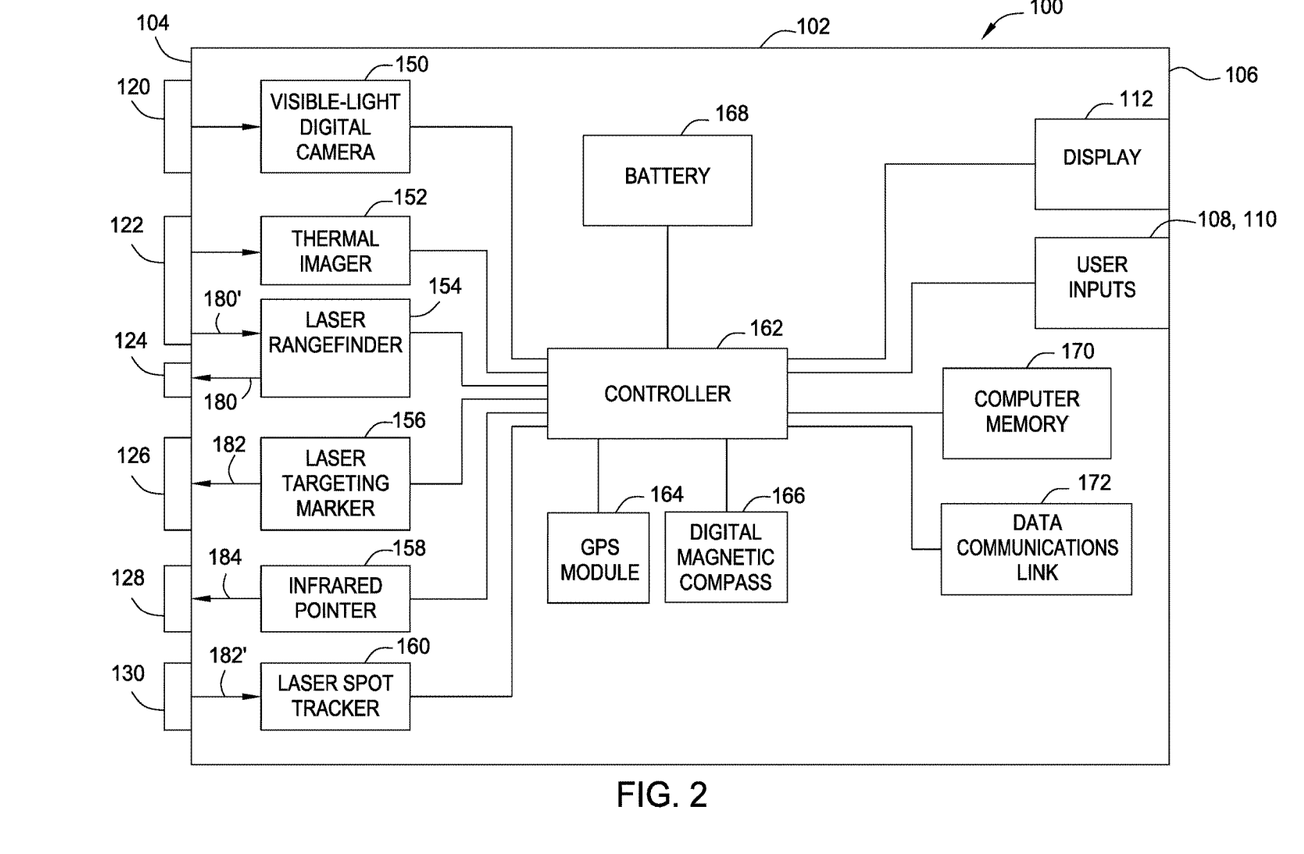
FIG. 2 is a block diagram of the handheld laser targeting device of FIG. 1A.

FIG. 2 is a block diagram illustrating components included in the handheld targeting device 100. The handheld targeting device 100 includes a visible light digital camera 150 (also referred to as a digital imaging camera) that is operable to receive visible light images via the first lens 120. The visible light digital camera 150 is in communication with a controller 162. The controller 162 is operable to receive the visible light images from the visible light digital camera 150 and output the visible light images for display on the display 112. In at least one aspect, the visible light digital camera 150 comprises a complementary metal-oxide-semiconductor (CMOS) sensor having 1.75 µm pixels and a resolution of 2,592 pixels by 1,944 pixels. In at least one aspect, the CMOS sensor is operable to detect visible light (e.g., light having wavelengths between 450 nm and 700 nm) and/or near-infrared light (e.g., light having wavelengths between 800 nm and 1,100 nm). In various aspects, the controller 162 can selectively operate the CMOS sensor to detect one or both of visible light and near-infrared light. In one aspect, the first lens 120 has a focal length of 27 mm and a relative aperture (i.e., an f-stop) of f/3.0. As discussed above, an optical axis of the first lens 120 is aligned with the longitudinal axis 114 such that a center of the visible light image captured by the visible light digital camera 150 is substantially aligned with the longitudinal axis 114.

In at least one aspect, the handheld targeting device 100 optionally includes a thermal imager 152 that is operable to receive infrared light images via the second lens 122. The thermal imager 152 is in communication with the controller 162. The controller 162 is operable to receive the infrared light images from the thermal imager 152 and output a visible light representation of the infrared light images on the display 112. In at least one aspect, the thermal imager 152 comprises a long wavelength infrared sensor having 17 μm pixels and a resolution of 640 pixels by 480 pixels. In at least one aspect, the long wavelength sensor is operable to detect light having wavelengths between approximately 7,500 nm and 14,000 nm. In one aspect, the second lens 122 has a focal length of 65 mm and a relative aperture of f/1.25. As discussed above, an optical axis of the second lens 122 is aligned with the longitudinal axis 114 such that a center of the infrared light image captured by the thermal imager 152 is substantially aligned with the longitudinal axis 114.

In at least one aspect, an operator may select between a visible light image captured by the visible light digital camera 150 and an infrared light image captured by the thermal imager 152 via one of the user inputs 108 or 110. In such aspects, the controller 162 is operable to receive user commands from the user input 108 or 110 and send control signals to the visible light digital camera 150 and/or the thermal imager 152 to activate/deactivate the relevant systems. For example, if an operator selects a visible light image, then the controller 162 may send a control signal to the thermal imager 152 that turns off the thermal imager 152 or that puts the thermal imager 152 in a sleep mode. Continuing the example, if an operator later selects an infrared light image, then the controller 162 may send a control signal to the thermal imager 152 that turns on the thermal imager 152 and a control signal to the visible light digital camera 150 that turns off the visible light digital camera 150 or that puts the visible light digital camera 150 in a sleep mode.

The controller 162 can also provide an electronically zoomed-in image on the display. In at least one aspect, the resolution of the display 112 is less than the resolution of the visible light digital camera 150, so the controller 162 can display an image on the display 112 that only includes pixels toward the center of the sensor for the visible light digital camera 150. For example, in the aspect described above, the visible light digital camera 150 has a resolution of 2,592 pixels by 1,944 pixels and the display has a resolution of 1,280 pixels by 720 pixels. Thus, the controller 162 can "zoom" images from the visible light digital camera 150 by only transmitting to the display 112 the center-most 1,280 pixels by 720 pixels from the visible light digital camera 150 without losing any resolution. The controller 162 may be able to provide additional zooming before the displayed image on the display 112 becomes too pixelated for use. The controller 162 can provide similar electronic zooming for images from the thermal imager 152.

The handheld targeting device 100 also includes an eye-safe laser rangefinder 154 that is operable to emit a laser beam and calculate a distance to a target based on the returned laser beam reflecting off the target. For example, the laser rangefinder 154 could calculate a distance to a target based on a time of flight for the laser beam to travel to the target and to travel back to the handheld targeting device 100. The laser rangefinder 154 emits a first pulsed laser beam 180 via the first aperture 124 in the first end 104 of the housing 102. In one aspect, the first pulsed laser beam 180 has a wavelength of 1535 nm and has a power of 0.180 millijoules (mJ) per pulse. The first pulsed laser beam can be ANSI Class 1 in certain aspects, which is eye-safe and skin-safe at all ranges and durations. The laser rangefinder 154 receives the returned first pulsed laser beam 180' via the second lens 122, discussed above. By combining the lenses for the thermal imager 152 and the laser rangefinder 154 into a single lens (i.e., the second lens 122), the surface area of the first end 104 of the housing 102 is reduced. Stated differently, if the thermal imager 152 and the laser rangefinder 154 had separate lenses, then a cross-sectional area of the first end 104 would have to be increased. Accordingly, the size and weight of the handheld targeting device 100 would also be increased if the thermal imager 152 and the laser rangefinder 154 had separate lenses.

In at least one aspect, the second lens 122 includes a beam splitter that separates the wavelengths of light received by the lens 122. For example, the lens 122 could include a beam splitter that passes light with a wavelength of approximately 1535 nm (e.g., the returned first pulsed laser beam) to the laser rangefinder 154 and reflects light with wavelengths between approximately 7,500 nm and approximately 14,000 nm to the thermal imager 152.

The laser rangefinder 154 is substantially aligned with the longitudinal axis 114 such that the laser rangefinder 154 emits the first pulsed laser beam 180 in a direction along the longitudinal axis 114 and is therefore calculating a distance along the longitudinal axis 114.

The laser rangefinder 154 is in communication with the controller 162. In the event an operator selects a laser range finding mode (e.g., via the user inputs 108 and 110), the controller 162 transmits control signals to the laser rangefinder 154. In turn, the laser rangefinder 154 emits the first pulsed laser beam 180 toward a target and receives the returned pulsed laser beam 180'. The laser rangefinder 154 calculates a distance to the target and transmits the calculated distance to the controller 162. The controller 162 can then output the distance for display on the display 112. The controller 162 can also use the calculated distance to determine a position of the target, discussed in greater detail below with reference to FIGS. 3A and 3B.

The handheld targeting device 100 also includes a laser targeting marker 156 that emits a second pulsed laser beam 182 via the second aperture 126 in the first end 104 of the housing 102. The second pulsed laser beam 182 output by the laser targeting marker 156 can be detected by sensors onboard a vehicle and/or weapon to indicate the target or provide guidance to the target, as discussed above. In one aspect, the second pulsed laser beam 182 has a wavelength of 1064 nm and a power of 25 mJ per pulse. In at least one aspect, the pulses have a duration of between 7 ns and 10 ns. In at least one aspect, the pulses are coded. The coding can allow for identification of the second pulsed laser beam 182 by other personnel, vehicles, and/or weapons that can detect the second pulsed laser beam 182. For example, the second pulsed laser beam 182 could be coded in advance of use during a mission with a selected code from an allowable set of codes. For example, the allowable codes could be governed by NATO Standard NATO Agreement (STANAG) 3733 in at least one aspect.

The laser targeting marker 156 is aligned with the longitudinal axis 114 such that the laser targeting marker 156 emits the second pulsed laser beam 182 in a direction along the longitudinal axis 114 and therefore illuminates a target that is aligned with the longitudinal axis 114.

The laser targeting marker 156 is in communication with the controller 162. In the event an operator selects a laser targeting mode (e.g., via the user inputs 108 and 110), the controller 162 transmits control signals to the laser targeting marker 156. In turn, the laser targeting marker 156 emits the second pulsed laser beam 182 toward a target.

The handheld targeting device 100 optionally includes a laser spot tracker 160 (e.g., a NATO STANAG 3733-compliant laser spot tracker) that is operable to receive the returned second pulsed laser beam 182' reflected off the target via the fourth aperture 130. The laser spot tracker 160 can also receive pulsed laser beams from laser target markers of other targeting devices (e.g., other handheld targeting devices 100). The laser spot tracker 160 can decode the returned second pulsed laser beam 182' as well as pulsed laser beams from other laser target markers. As a result, using pre-coordinated laser code assignments, the laser spot tracker 160 can identify the sources of other pulsed laser beams that it detects.

In at least one aspect, the laser spot tracker 160 includes a detector, amplifier/pulse discriminator, and a processor (which may be the controller 162 or a distinct processor. The amplifier/pulse discriminator "qualifies" incoming pulses, meaning that the amplifier/pulse discriminator counts a first number of incoming pulses with a pre-coordinated code (e.g., a NATO STANAG 3733 code). When a sufficient number of pulses with a pre-coordinated code are received, the processor declares a "lock" and anticipates the next pulse arrival. Absent a detected code, there is not "lock" or detection. The detector for the laser spot tracker 160 is arranged as four quadrants. The laser spot tracker 160 includes optics that blur an incoming laser spot onto the detector, causing different amounts of energy from the incoming laser spot to fall on the different quadrants of the detector. By measuring the energy levels for the four quadrants on a "locked" pulse, the laser spot tracker 160 can calculate a bearing angle and an elevation angle relative to the longitudinal axis 114. In at least one aspect, the laser spot tracker 160 can simultaneously track eight different laser spots with eight different codes, respectively.

The laser spot tracker 160 is aligned with the longitudinal axis 114 such that a center of the laser spot tracker 160 is aligned with the longitudinal axis 114.

The laser spot tracker 160 is in communication with the controller 162. As discussed above, when the user selects a laser targeting mode, the controller 162 transmits control signals to the laser targeting marker 156, thereby causing the laser targeting marker 156 to transmit the second pulsed laser beam 182 toward the target. At the same time, the controller 162 transmits control signals to the laser spot tracker 160 to activate the laser spot tracker 160. In the event the laser spot tracker 160 detects a pulsed laser beam (e.g., the returned pulsed laser beam 182' or another pulsed laser beam), the laser spot tracker 160 can provide an indication of the direction and code of the detected pulsed laser beam to the controller 162. The controller 162, in turn, can output for display on the display 112 an indication of the detected pulsed laser beam and, where applicable, an identification associated with the identified code. In at least one aspect, an operator could use the laser spot tracker 160 without using the laser targeting marker 156. For example, in certain scenarios, an operator may want to detect emitted targeting laser beams (e.g., second pulsed laser beams 182) emitted by other handheld targeting devices 100 but not emit a second pulsed laser beam 182 from their own handheld targeting device 100. In such a scenario, the controller 162 could activate the laser spot tracker 160 without activating the laser targeting marker 156.

In at least one aspect, the handheld targeting device 100 optionally includes an infrared pointer 158. The infrared pointer 158 is operable to emit a near-infrared beam 184 that is detectable by near-infrared imagers, such as the visible light digital camera 150 when configured for near-infrared operation and near-infrared imagers associated with other devices. In certain aspects, the infrared pointer 158 can act as a "flashlight" for the thermal imager 152. The infrared pointer 158 could admit the infrared beam 184 constantly or in a blinking pattern. The infrared pointer 158 could be operated to communicate with other users of handheld targeting devices 100. For example, in one scenario, an operator of one handheld targeting device 100 could use the infrared pointer 158 to output a Morse code message that users of other handheld targeting devices 100 could detect using the respective thermal imagers 152. In at least one aspect, the infrared pointer 158 outputs an infrared beam 184 having a wavelength of 830 nm and a power of 270 mW. In various other aspects, the infrared pointer 158 could output an infrared beam 184 having a different wavelength and/or power.

The infrared pointer 158 is in communication with the controller 162. As discussed above, an operator could use the user inputs 108 and/or 110 to activate the infrared pointer 158 and to control operation of the infrared pointer 158. For example, the operator could use a user input 108 and/or 110 to turn on the infrared pointer 158 for constant operation, to turn on the infrared pointer 158 in a blinking manner, and/or to turn on and off the infrared pointer 158 to transmit a message. Continuing the example, in one scenario, a user could input a Morse code message using the button 108C (or any of the other buttons displayed in FIGS. 1A-1C. In another aspect, a user could use the user inputs 108 and 110 to input a text message for transmission and the display 112 could illustrate the text message being prepared. When the message is complete, the controller 162 could output the message to the infrared pointer 158 in a Morse code pattern or other pattern. The infrared pointer 158 then emits the infrared beam in a manner to output the pattern.

The infrared pointer 158 is aligned with the longitudinal axis 114 such that the infrared pointer 158 emits the infrared beam 184 in a direction along the longitudinal axis 114.

In at least one aspect, the handheld targeting device 100 includes a self-location module 164 (e.g., a global positioning system (GPS) module) that is operable to detect a two-dimensional or three-dimensional position of the housing 102. Although the self-location module 164 displayed in the figures is a GPS module, other self-locations modules are possible. For example, the self-location module 164 could by a global navigation satellite system (e.g., GLONASS, Galileo, or GAGAN), a ground station triangulation system (e.g., LORAN or eLORAN), inertial navigation systems, and/or aircraft-based location systems (e.g., VORs and NDBs). The self-location module 164 detects at least a latitude and longitude of the housing 102. Additionally, the self-location module 164 can detect an altitude (e.g., relative to sea level) of the housing 102. The self-location module 164 is in communication with the controller 162 such that the self-location module 164 can transmit the determined latitude, longitude, and altitude (where applicable) to the controller 162. The controller 162 can output for display on the display 112 the determined location of the housing 102. Furthermore, as discussed in greater detail below with reference to FIGS. 3A and 3B, the controller 162 can use the determined location of the housing 102 to calculate a location of a target.

In at least one aspect, the handheld targeting device 100 includes a digital magnetic compass 166 that is operable to detect a direction in which the housing 102 is pointed. In one aspect, the digital magnetic compass 166 is oriented in the housing 102 in alignment with the longitudinal axis 114 such that a compass direction output by the digital magnetic compass 166 indicates a direction in which the longitudinal axis 114 extending out of the first end 104 of the housing 102 is pointed. In at least one aspect, the digital magnetic compass 166 is also operable to detect an elevation angle of the longitudinal axis 114. Stated differently, the digital magnetic compass 166 can detect an angle of the longitudinal axis 114 extending out of the first end 104 of the housing 102 relative to a horizon line or a level line. In at least one aspect, the digital magnetic compass 166 determines a heading to an accuracy of 0.25° and determines an elevation angle to an accuracy of plus or minus 0.1°. In other aspects, the digital magnetic compass 166 may determine heading and elevation angle to other degrees of accuracy.

The handheld targeting device 100 can also include a computer memory 170 in communication with the controller 162. In at least one aspect, the computer memory 170 can be incorporated in or as part of the controller 162. The computer memory 170 can store, among other things, location information for identified targets. The controller 162 can access the stored location information in the computer memory 170 to display icons representing the targets on the display 112, discussed in greater detail below with reference to FIG. 4.

The handheld targeting device 100 can also include a data communications link 172, in communication with the controller 162, that can send/receive information (e.g., target location information) to/from other equipment, such as other handheld targeting devices. The controller 162 can transmit location information for targets to other equipment (e.g., other handheld targeting devices 100, vehicles, and weapons) via the data communications link 172. The data communications link 172 can also receive location information for targets from other equipment. The data communications link 172 can transmit the received location information to the controller 162, and the controller can store the received location information in the computer memory 170. The data communications link 172 can comprise one or more data communications links and/or methods. For example, the data communications link 172 can include an RJ-45 port and/or USB port for connection to a satellite communications device, a computer network, or other communications device. As another example, the data communications link 172 could include a satellite communications antenna for direct connection to a satellite communications network. As yet another example, the data communications link 172 could include a radio transceiver for sending and receiving data over radio communications frequencies (e.g., very high-frequency (VHF) frequencies, ultrahigh frequency (UHF) frequencies, and high-frequency (HF) frequencies). The above examples are merely illustrative of possible types of data communications links 172. Other types of data communications links 172 our contemplated.

The handheld targeting device 100 also includes a battery 168 or other power supply. The battery 168 is electrically connected to the controller 162. The controller 162 can selectively transmit power to the various other components of the handheld targeting device. For example, the controller 162 can selectively transmit power from the battery 168 to the visible light digital camera 150 or the thermal imager 152, depending on a mode selected by an operator.

Figure 3A:
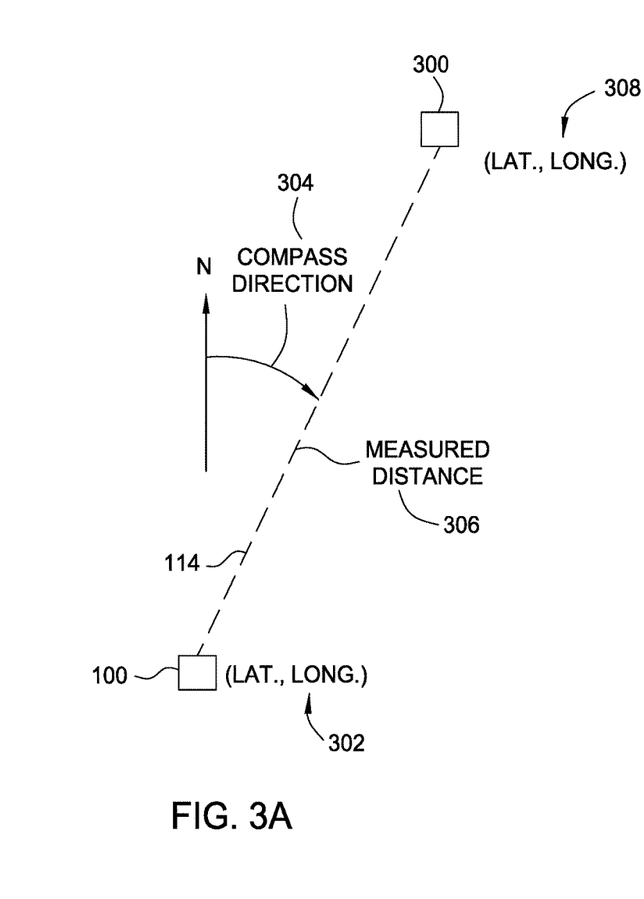
FIG. 3A is a schematic diagram illustrating a scenario in which a two-dimensional position of a target is calculated.
Figure 3B:
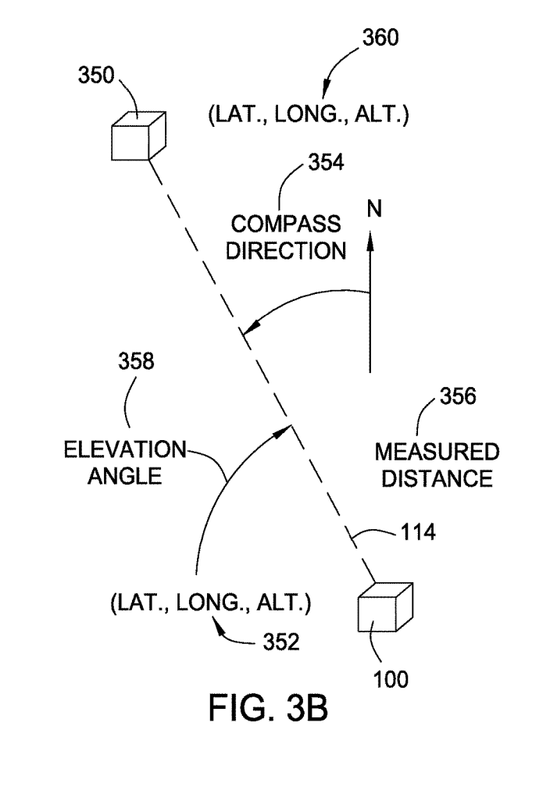
FIG. 3B is a schematic diagram illustrating a scenario in which a three-dimensional position of a target is calculated.

FIGS. 3A and 3B illustrate scenarios used to describe how the controller 162 can calculate two-dimensional and three-dimensional locations, respectively, of targets, based on information received from the various components of the handheld targeting device 100. FIG. 3A illustrates a scenario in which the handheld targeting device 100 is located at a first location and a target 300 is located at a second location that is approximately in a north northeast direction from the handheld targeting device 100. In this scenario, the controller 162 receives a latitude and longitude 302 of the housing 102 from the self-location module 164. The handheld targeting device 100 is oriented with the longitudinal axis 114 extending from the first end 104 of the housing 102 pointing toward the target 300. The user can visualize the target 300 using a visible light image (from the visible light digital camera 150) or an infrared image (from the thermal imager 152) displayed on the display 112 to align the longitudinal axis 114 of the housing 102 with the target 300. When the longitudinal axis 114 of the housing 102 is aligned with the target 300, the user can activate the laser rangefinder 154 (e.g., using the user inputs 108 and/or 110), causing the laser rangefinder 154 to calculate a measured distance 306 to the target 300, as discussed above. The laser rangefinder 154 transmits the calculated measured distance 306 to the controller 162. At the same time that the laser rangefinder 154 calculates the measured distance 306, the digital magnetic compass 166 determines a compass direction 304 of the longitudinal axis 114 relative to magnetic north (or geometric north or another standardized direction). The digital magnetic compass 166 outputs the determined compass direction 304 to the controller 162. The controller 162 then calculates the latitude and longitude 308 of the target 300 based on the latitude and longitude 302 of the handheld targeting device 100, the determined compass direction 304, and the measured distance 306. The controller 162 can then store the calculated latitude and longitude 308 of the target 300 in the computer memory 170.

FIG. 3B illustrates another scenario in which the handheld targeting device 100 is located at a first location and a target 350 is located at a second location that is in approximately a north northwest direction from the handheld targeting device 100. In this scenario, the controller 162 receives a latitude, longitude, and altitude 352 of the housing 102 from the self-location module 164. The handheld targeting device 100 is oriented with the longitudinal axis 114 extending from the first end 104 of the housing 102 pointing toward the target 350. In this scenario, the target 350 is higher than the handheld targeting device 100. As a result, the user orients the longitudinal axis 114 extending from the first end 104 of the housing 102 in the compass direction 354 of the target 350 and also at an elevation angle 358 such that the longitudinal axis 114 points toward the target 350. Again, the user can visualize the target 300 using a visible light image (from the visible light digital camera 150) or an infrared image (from the thermal imager 152) displayed on the display 112 to align the housing 102 with the target 350. When the housing 102 is aligned with the target 350, the user can activate the laser rangefinder 154 (e.g., using the user inputs 108 and/or 110), causing the laser rangefinder 154 to calculate a measured distance 356 to the target 350, as discussed above. The laser rangefinder 154 transmits the calculated measured distance 356 to the controller 162. At the same time that the laser rangefinder 154 calculates the measured distance 356, the digital magnetic compass 166 determines a compass direction 354 of the longitudinal axis 114 relative to magnetic north (or geometric north or another standardized direction) and also determines an altitude angle 358 of the longitudinal axis 114 relative to a horizon line or a level line. The digital magnetic compass 166 outputs the determined compass direction 354 and the determined altitude angle 358 to the controller 162. The controller 162 calculates the latitude, longitude, and altitude 360 of the target 350 based on the latitude, longitude, and altitude 352 of the handheld targeting device 100, the determined compass direction 354, the determined elevation angle 358, and the measured distance 356. The controller 162 can then store the calculated latitude, longitude, and altitude 360 of the target 350 in the computer memory 170.

Figure 4:
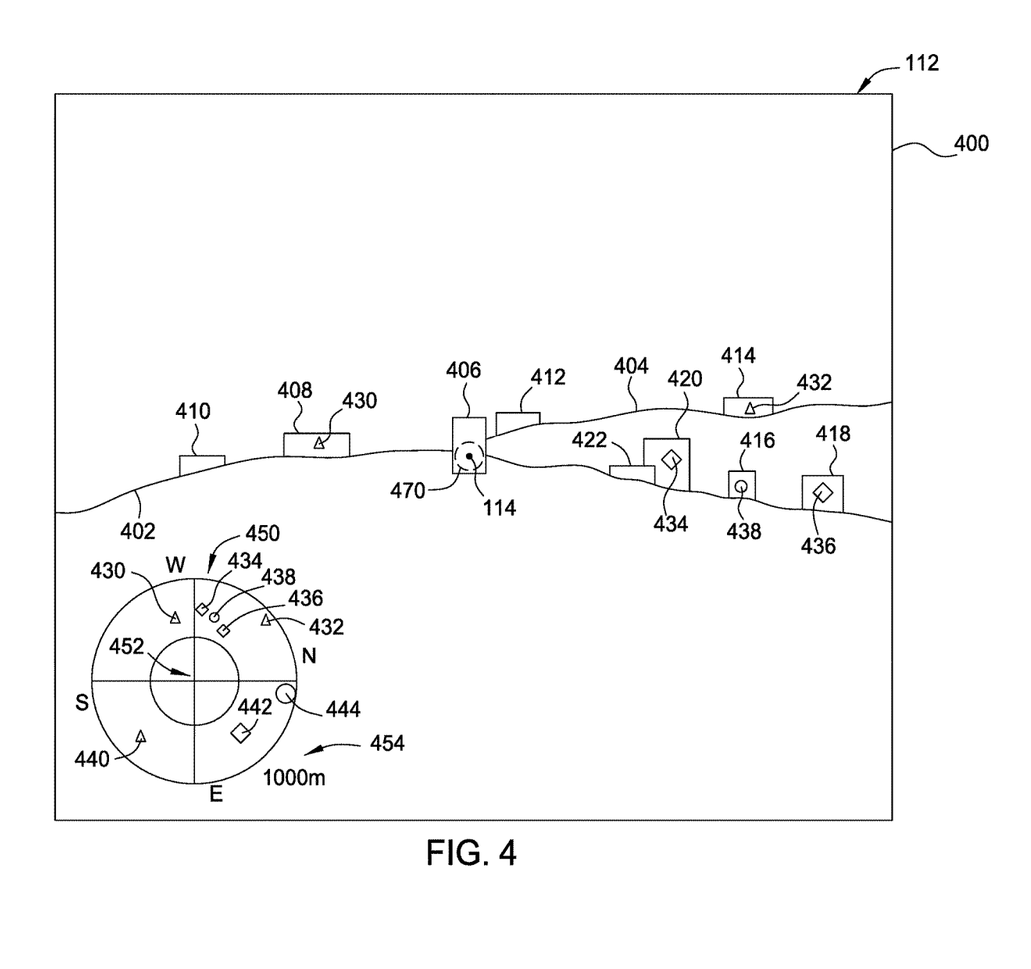
FIG. 4 illustrates an exemplary view on a display screen of the handheld laser targeting device of FIG. 1.

FIG. 4 illustrates an exemplary image 400 output by the controller 162 on the display 112. The image 400 may include a visible light image from the visible light digital camera 150 and/or a thermal image from the thermal imager 152. The image 400 shows a landscape with a first hill 402 and a second hill 404 behind the first hill 402. A number of structures (e.g., buildings and vehicles) are arranged on respective ones of the first hill 402 and the second hill 404. For example, structures 410, 408, 406, 420, 422, 416, and 418 are arranged on the first hill 402. Structures 412 and 414 are arranged on the second hill 404. The image 400 includes an indication of the longitudinal axis 114 at the center of the image 400. In the scenario depicted in FIG. 4, the longitudinal axis 114 is aligned with a structure 406 on the first hill 402.

As discussed above, the laser targeting marker 156 can output a second pulsed laser beam 182 and the laser spot tracker 160 can detect the returned second pulsed laser beam 182'. Furthermore, the laser spot tracker 160 is aligned with the longitudinal axis 114 such that a center of the laser spot tracker 160 is aligned with the longitudinal axis 114 and thereby with the center of the image 400. In the event the laser targeting marker 156 the returned second pulsed laser beam 182 is detected by the laser spot tracker 160, the controller 162 can output for display on the display 112 a graphical indication of the second pulsed laser beam 182. Referring to FIG. 4, the controller could overlay a broken line circle 470 (or other graphical icon) on the image 400 as a graphical indication of the returned second pulsed laser beam 182'. Since the laser targeting marker 156 is aligned with the longitudinal axis 114, the broken line circle 470 is substantially aligned with the indication of the longitudinal axis 114 at the center of the image 400.

In the scenario depicted in FIG. 4, positions of several targets have been identified and stored in memory, as discussed above with reference to FIGS. 3A and 3B. For example, a location for the structure 408 on the first hill 402 has already been calculated and stored in the computer memory 170. Since the location of the structure 408 is visible in the image 400, a graphical indication 430 of the stored location is overlaid on the image 400. In this scenario, the graphical indication 430 is a triangle. The triangle graphical indication may be used to indicate a calculated location that was determined by the handheld targeting device 100. The image 400 shows another graphical indication 432 overlaid on the image of the structure 414 on the second hill 404. The graphical indication 432 is another triangle, indicating that the location was determined by the handheld targeting device 100.

The image 400 shows graphical indications 434 and 436 on the structures 418 and 420, respectively, on the first hill 402. Here, the graphical indications 434 and 436 are diamonds, which indicate a calculated location that was determined by another targeting device. As discussed above, the handheld targeting device 100 can receive targeting location information from other targeting devices via the data communications link 172, and the controller 162 can overlay the graphical indications 434 and 436 for the received target locations on the image 400. As also discussed above, the laser spot tracker 160 of the handheld targeting device 100 can receive a second pulsed laser beams 182 from the laser targeting marker 156 and other pulsed laser beams from other targeting devices. The graphical indications 434 and 436 could also indicate locations at which pulsed laser beams from other laser targeting devices have been directed. Referring again to locations received over the data communications link 172, such data communications can be encrypted or include other forms of security to ensure that only friendly communications are received. Put differently, the data communications link 172 can be secure such that the handheld targeting device 100 does not receive incorrect or misleading location information via the data communications link 172.

The image 400 shows a graphical indication 438 on the structure 416 on the first hill 402. Here the graphical indication 438 is a circle, which indicates a location that was targeted and identified as non-hostile or friendly (e.g., a friendly troop emplacement or a hospital). The various graphical indications 430, 432, 434, 436, 438 are merely examples of one possible scheme of icons to distinguish between different types of targets. Other graphical schemes are contemplated by this application.

The various graphical indications 430, 432, 434, 436, 438 correspond to locations that are within the view of the image 400 and are therefore overlaid on top of the image 400. The computer memory 170 may store locations that are not within a field of view displayed on the image 400. In at least one aspect, the controller 162 can also overlay on the image 400 and overhead view 450 to show relative locations to stored locations that are both visible in the image 400 and not visible in the image 400. The exemplary overhead view 450 depicted on the image 400 is arranged as two concentric circles where a position of the handheld targeting device 100 is located at the center 452 of the concentric circles. Optionally, the overhead view 450 can include a range indication 454, which indicates 1000 m in this scenario. The range indication 454 is positioned next to the outermost of the two concentric circles, such that the outermost circle corresponds to a distance of 1000 meters and the innermost circle, which is halfway between the center 452 of the circles and the outermost circle, corresponds to a distance of 500 meters. The overhead view 450 indicates cardinal directions relative to a direction in which the handheld targeting device 100 is pointed. For example, in the exemplary overhead view 450 overlaid on the image 400, the longitudinal axis 114 of the handheld targeting device 100 is pointed in a compass direction that is approximately West Northwest.

The overhead view 450 illustrates the graphical indications 430, 432, 434, 436, and 438, discussed above, that are visible in the image 400. The overhead view 450 may provide a rough indication of distance and direction to each of the stored locations in the computer memory 170. The overhead view 450 also illustrates graphical indications 440, 442, and 444 of stored locations in the computer memory 170 that are not in the displayed image 400. The graphical indication 440 is a triangle, indicating a location that was calculated by the handheld targeting device 100. The graphical indication 442 is a diamond, indicating a location that was provided by another targeting device that has been identified as "friendly." The graphical indication 444 is a circle, indicating a non-hostile location. The graphical indications 440, 442, and 444 provide the user with a general situational awareness of not only locations that are within the field of view of the image 400 but also of locations that are surrounding the user. In various aspects, other schemes of graphical indications could be used to indicate locations determined by the handheld device 100, locations provided by "friendly" targeting devices, and locations of "foes". Examples of other schemes include different colors, different shapes, and the like.

The above-described handheld targeting device 100 that includes both a laser targeting system (e.g., the laser targeting marker 156 and the laser spot tracker 160) and a geolocation system (e.g., the laser rangefinder 154, self-location module 164, and digital magnetic compass 166) provides advantageous capabilities for a user. For example, a user may be tasked to provide laser targeting (using the laser targeting marker 156) for a sequence of targets, and may need to transition from one target to the next target rapidly. In scenarios in which targets are densely arranged with other targets and/or non-targets, providing such laser targeting can be challenging using a laser targeting marker alone. For example, from the user's vantage point in the scenario depicted in FIG. 4, structures 420 and 422 appear to be overlapping. At great distances, it may be difficult for the user to quickly determine which of the two buildings is the proper target. Using the handheld targeting device 100, a user can arrive at his location ahead of time and use the geolocation features (e.g., the laser rangefinder 154, self-location module 164, and digital magnetic compass 166) to identify the targets and calculate locations for the targets, as discussed above with reference to FIGS. 3A and 3B. As discussed above, the controller 162 can store the calculated locations in the computer memory 170. Thereafter, during the operation when the user is expected to rapidly transition from one target to the next using the laser targeting marker 156, the user is provided with an image on the display 112 with graphical indications of the calculated locations for the targets overlaid thereon. The graphical indications can enable the user to rapidly move from one target to the next in sequence. For example, the graphical indication 434 on the structure 420 provides an indication to the user to target structure 420 rather than structure 422.

Another advantageous capability of the above-described handheld targeting device 100 is that a user has flexibility to provide targeting information to other vehicles, weapons, and/or personnel. For example, consider a scenario in which a user is positioned to provide laser targeting for a laser guided weapon. However, the vehicle carrying the laser guided weapon may not be able to deploy the weapon (e.g., in the event of a malfunction). It may be that another laser-guided weapon is not available but a GPS-guided weapon is available. Using the above described handheld targeting device, the user could calculate a location of the target using the geolocation features (e.g., the laser rangefinder 154, self-location module 164, and Digital magnetic compass 166) and provide the calculated location (using the data communications link 172) for the GPS-guided weapon.

Another advantageous capability of the above-described handheld targeting device 100 are certain anti-fratricide capabilities. For example, as discussed above, the handheld targeting device 100 can store locations of targets determined by the handheld targeting device 100 or by other devices. The controller 162 in the handheld targeting device 100 can receive positions for the handheld targeting device 100 via the self-location module 164 as a soldier carries the handheld targeting device 100. If the handheld targeting device 100 gets too close to one of the stored target locations (e.g., within 100 yards), the controller 162 can output a warning to the display 112, instructing the soldier carrying the handheld targeting device 100 to move away. The warning could include a more-detailed instruction that informs the soldier of a direction to move to provide distance from the target.

As another example of an anti-fratricide capability, the controller 162 can determine when other soldiers (using other devices) are too close to a stored target location. As discussed above, the handheld targeting device 100 can receive information from other devices via the data communications link 172. The received information can include locations of the other devices. The controller 162 can compare the received locations of other devices to the stored target locations to determine whether any of the received locations are too close to the stored target locations. In the event a received location is too close to a stored target location, the controller 162 can output a warning to the display 112.

As another example of an anti-fratricide capability, the controller 162 can provide an indication on the display 112 is the laser targeting marker 156 and/or infrared pointer 158 are pointed too closely at a non-hostile target. As discussed above with reference to FIG. 4, locations associated with non-hostile targets can be designated as non-hostile (e.g., by using the user inputs 108 and 110). Thereafter, during use of the laser targeting marker 156 or the infrared pointer 158, the controller 162 can determine whether the first pulsed laser beam emitted by the laser targeting marker 156 or the infrared beam emitted by the infrared pointer 158 passes within a predetermined distance of a non-hostile target, based on the position, bearing, and elevation angle of the handheld targeting device 100 determined by the self-location module 164 and the digital magnetic compass 166, respectively. In the event the first pulsed laser beam emitted by the laser targeting marker 156 or the infrared beam emitted by the infrared pointer 158 is calculated to be passing within a predetermined distance of a non-hostile target, the controller 162 can output a warning to the display 112. For example, the controller 162 could overlay on an image displayed on the display 112 of the non-hostile target a red circle that illustrates a region in which the user of the handheld targeting device 100 should not aim the first pulsed laser beam emitted by the laser targeting marker 156 or the infrared beam emitted by the infrared pointer 158. In at least one aspect, the controller 162 may display the above-described red circle (or other graphical scheme) at all times the non-hostile target is visible on the display 112.

In certain aspects discussed above with respect to anti-fratricide capabilities, the safe distances (i.e., risk-estimate distances) from stored target locations could be set to a default value, such as one hundred feet or one hundred meters. In at least one aspect, the computer memory 170 could store different risk-estimate distances for respective munition types. For example, a first smart bomb may have a risk-estimate distance of one hundred meters, meaning that damage from the first smart bomb exploding causes damage to structures and persons within one hundred meters of the detonation point. A second, larger smart bomb may have a risk-estimate distance of three hundred meters. The computer memory 170 may store an association between a stored target location and a munition type before a mission begins (i.e., before the handheld targeting device 100 is deployed for use during the mission). For example, a mission plan may include a first stored target location that is planned to be struck with a first smart bomb and a second stored target location that is planned to be struck with a second smart bomb that is different than the first smart bomb. The controller 162 could use the stored associations to apply a first risk-estimate distance for the first smart bomb to the first stored location and to apply a second risk-estimate distance for the second bomb to the second stored location.

In at least one aspect, an operator may select to simultaneously display images captured by both the visible light digital camera 150 and the thermal imager 152 on the display 112. For example, such operation may be used at night to provide a night vision view in the display 112 (via the thermal imager 152) and to also provide an image of emitted pulsed laser beams and infrared beams. As discussed above, at least one aspect of the visible light digital camera 150 can receive near-infrared wavelengths of light between 800 nm and 1,100 nm. Such a visible light digital camera 150 can detect certain laser target markers and infrared beams (e.g., the second pulsed laser beam emitted by the laser targeting marker 156 and the infrared beam emitted by the infrared pointer 158). Because ambient visible light (e.g., wavelengths of light between 450 nm and 700 nm) is very low at night, the near infrared images of such laser beams and infrared beams appear against a black field in the visible-light image. The controller 162 can perform image analysis on this visible-light image to identify and isolate the images of the laser beams and infrared beams. The isolated images of the laser beams and infrared beams can then be superimposed on the night vision image from the thermal imager 152. For example, the images of laser beams and infrared beams can be superimposed in false color on the display 112.

Aspects described herein may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products according to aspects described herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects described herein. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects, other and further aspects described herein may be devised without departing from the basic scope thereof, and the scope thereof is determined by the claims that follow.

What is claimed is:

1. A targeting device comprising;
a housing;
a laser rangefinder arranged in the housing;
a laser targeting marker arranged in the housing;
a digital imaging camera arranged in the housing;
a first lens configured to transmit visible light to the digital imaging camera;
a display screen;
a thermal imager;
a first aperture housing the first lens for the digital imaging camera;
a second aperture housing a second lens for the thermal imager and the laser rangefinder;
a third aperture through which a first pulsed laser beam emitted from the laser rangefinder passes;
a fourth aperture through which a second pulsed laser beam emitted by the laser targeting marker passes;
an infrared pointer;
a fifth aperture through with the infrared pointer passes;
a laser spot tracker;
a sixth aperture in communication with the laser spot tracker; and
computer memory in communication with a controller, said computer memory storing a plurality of risk-estimate distances for respective ones of a plurality of munitions and a plurality of locations associated with other entities;
wherein the controller is operably connected to the laser rangefinder, the laser targeting marker, the digital imaging camera and the display screen, and wherein the controller is operable to:
display on the display screen at least one image based on data obtained from the digital imaging camera;
instruct the laser rangefinder to emit the first pulsed laser beam;
calculate a location of an object based on the first pulsed laser beam as reflected by the object within a path of the first pulsed laser beam from the laser rangefinder;
calculate distances from the object having reflected the first pulsed laser beam to the plurality of locations stored in the computer memory and compare said distances to the plurality of risk-estimate distances stored in the computer memory;
overlay on the at least one image a graphical indication of the object having reflected the first pulsed laser beam when the calculated location of the object is within a field of view of the digital imaging camera; and
provide an alert when the distance from the object having reflected the first pulsed laser beam is less than one of the plurality of risk-estimate distances from the object to any of the plurality of locations stored in the computer memory.

2. The targeting device of claim 1, wherein the controller is further operable to store in the computer memory a plurality of calculated locations for a plurality of objects, and overlay on the display of the at least one image on the display:
graphical indications of any of the plurality of objects with stored calculated locations within the field of view of the digital imaging camera.

3. The targeting device of claim 2, further comprising a data communications link operable to emit the plurality of calculated locations of the plurality of objects to a remote computer server.

4. The targeting device of claim 3, wherein the data communications link is further operable to receive calculated locations of other objects; and wherein the controller is further operable to:
store the received calculated locations of the other objects; and
overlay on the display of the at least one image graphical indications of any of the other objects with stored calculated locations within the field of view of the digital imaging camera.

5. The targeting device of claim 1, wherein the controller is further operable to instruct the laser targeting marker to emit the second pulsed laser beam, wherein the laser spot tracker is operable to receive the second pulsed laser beam emitted by the laser targeting marker; and
wherein the controller is further operable to display on the display of the at least one image on the display a graphical indication of the second pulsed laser beam.

6. The targeting device of claim 5, wherein the laser spot tracker is further operable to receive other second pulsed laser beams emitted by other laser target markers; and
wherein the controller is further operable to display on the at least one image on the display a graphical indication of the other second pulsed laser beams.

7. The targeting device of claim 6, wherein the laser spot tracker is further operable to detect codes in the other second pulsed laser beams, and wherein the controller is further operable to display information related to the code on the display screen.

8. The targeting device of claim 6,
wherein the controller is operably connected to the infrared pointer, and wherein the controller is further operable to instruct the infrared pointer to emit an infrared beam,
wherein the controller is operably connected to the thermal imager, and wherein the controller is further operable to instruct the thermal imager to capture infrared images within a field of view of a third lens of the thermal imager; and wherein the controller is further operable to display the captured infrared images on the display screen.

9. The targeting device of claim 8, wherein the laser rangefinder receives the first pulsed laser beam and the thermal imager receives the infrared images through the second lens.

10. The targeting device of claim 8, further comprising a user input operable to receive user selections of modes of operation, and wherein the controller is further operable to selectively operate one or more of the laser rangefinder, the infrared pointer, the laser targeting marker, and the laser spot tracker in response to the received user selections.

11. The targeting device of claim 1, further comprising a self-location module and wherein the controller is further operable to calculate an altitude of the object targeted by the laser rangefinder based on a determined altitude of the housing, a determined elevation angle of a longitudinal axis of the housing, and the calculated distance from the laser rangefinder.

12. A handheld targeting device, comprising
a housing;
a first lens arranged on the housing and configured to transmit visible light to a digital imaging camera arranged in the housing;
a laser rangefinder arranged in the housing and operable to emit a first pulsed laser beam towards an object;
a second lens arranged on the housing and configured to transmit infrared light to a thermal imager arranged in the housing, the second lens further configured to receive a returned first pulsed laser beam reflected by a first object in a path of the first pulsed laser beam;
a laser targeting marker arranged in the housing and operable to emit a second pulsed laser beam towards a second object;
a laser spot tracker arranged in the housing and operable to receive a third pulsed laser beam reflected by the second object in the path of the second pulsed laser beam;
a display screen; and
a controller arranged in the housing and operable to:
display on the display screen at least one image based on data obtained by the digital imaging camera, the thermal imager or a combination of both the digital imaging camera and the thermal imager; and
overlay on the display of the at least one image a graphical indication of a third object that has previously reflected the second pulsed laser beam while the second pulsed laser beam is currently being reflected by the second object.

13. The handheld targeting device of claim 12, further comprising computer memory in communication with the controller, wherein the computer memory stores location information of objects that have previously reflected the second pulsed laser beam and wherein the controller is further operable to:
overlay on the display of the at least one image a graphical indication of a plurality of objects that have reflected the second pulsed laser beam.

14. The handheld targeting device of claim 13, wherein the memory further stores:
a plurality of risk-estimate distances for a plurality of munitions; and
a plurality of locations associated with targets and other entities; and wherein the controller is further operable to:
provide an alert when the distance from a target to an entity is less than the risk-estimate distance for a selected munition.

15. The handheld targeting device of claim 14, wherein the memory further stores a plurality of codes associated with other targeting devices and wherein the controller is further operable to compare a code associated with an emitted laser beam from a targeting device against the stored plurality of codes and overlay on the display a graphical indication of a source of the other emitted laser beam.

16. The handheld targeting device of claim 15, further comprising:
a self-location module arranged in the housing;
an attitude determination unit; and
wherein the controller is further operable to:
determine the location of the first object that has reflected the first pulsed laser beam by:
receiving a location of the housing from the self-location module;
receiving a direction from the attitude determination unit;
calculating a distance based on the reflected first pulse laser beam;
calculating a location of the first object, based on the received location of the housing, the received attitude determination direction and the calculated distance based on the first pulsed laser beam; and
overlaying on the display a graphical indication of the location of the first object.

17. The handheld targeting device of claim 16, wherein the memory further stores a plurality of calculated locations for a plurality of objects, and overlay on the display graphical indications of any of the plurality of objects with stored calculated locations within a field of view of the digital imaging camera.

18. The handheld targeting device of claim 17, further comprising a data communications link operable to transmit the plurality of calculated locations of the plurality of objects to a receiver and operable to receive a plurality of locations for another plurality of objects.

19. A handheld targeting device, comprising
a housing that includes a first end and a second end, the housing defining a longitudinal axis between the first and second end;
a self-location module arranged in the housing;
a digital magnetic compass arranged in the housing;
a visible-light digital imaging camera arranged in the housing and operable to receive visible-light images, wherein the visible light digital imaging camera includes a first lens arranged in the first end of the housing, and wherein a first optical axis of the visible-light digital imaging camera is aligned in the housing such that captured visible-light images are aligned along the longitudinal axis;
a thermal imager arranged in the housing and operable to capture infrared images within a field of view of a second lens of the thermal imager arranged in the first end of the housing, wherein a second optical axis of the thermal imager is aligned in the housing such that captured infrared-light images are aligned along the longitudinal axis, wherein the second lens is arranged in the first end of the housing;
a display screen arranged on the second end of the housing, wherein the display screen is selectively operable to display the captured visible-light images or the captured infrared-light images;

a laser rangefinder arranged in the housing and operable to emit a first pulsed laser beam toward an object from the first end of the housing, receive a returned first pulsed laser beam, and calculate a distance to the object based on a characteristic of the returned pulsed laser beam, wherein the laser rangefinder is aligned in the housing such that the first pulsed laser beam is emitted along the longitudinal axis, wherein the laser rangefinder emits the first pulsed laser beam through a first aperture in the first end of the housing, and wherein the laser rangefinder receives the returned first pulsed laser beam through the second lens arranged in the first end of the housing;

a laser targeting marker arranged in the housing and operable to emit a second pulsed laser beam toward the object from the first end of the housing, wherein the laser targeting marker is aligned in the housing such that the second pulsed laser beam is emitted along the longitudinal axis, wherein the laser targeting marker emits the second pulsed laser beam through a second aperture in the first end of the housing;

an infrared pointer arranged in the housing and operable to emit an infrared beam, wherein the infrared pointer is aligned in the housing such that the infrared beam is emitted along the longitudinal axis, wherein the infrared pointer emits the infrared beam through a third aperture in the first end of the housing;

a laser spot tracker arranged in the housing and operable to receive the second pulsed laser beam emitted by the laser target marker, wherein the laser spot tracker receives the second pulsed laser beam through a fourth aperture in the first end of the housing;

a controller arranged in the housing and operable to:
  display on the display screen one of the visible-light images captured by the visible-light digital imaging camera and the infrared-light images captured by the thermal imager;
  determine a location of an object targeted by the laser rangefinder by:
    receiving a location of the housing from the self-location module;
    receiving a compass direction from the digital magnetic compass when the laser rangefinder emits the first pulsed laser beam; and
    calculating a location of the object, based on the received location of the housing, the received compass direction, and the calculated distance from the laser rangefinder; and
  after determining the location of the object, overlay on the display of the visible-light image on the display a graphical indication of the object when the calculated location of the object is within the field of view of the digital imaging camera; and
an elevation module operable to determine an elevation angle of the longitudinal axis, wherein the self-location module determines an altitude of the housing, and wherein the controller is further operable to calculate an altitude of the object targeted by the laser rangefinder based on the determined altitude of the housing, the determined elevation angle of the longitudinal axis, and the calculated distance from the laser rangefinder.

20. The handheld targeting device of claim 19, wherein the controller is further operable to store a plurality of calculated locations for a plurality of objects, and overlay on the display of the visible-light image on the display graphical indications of any of the plurality of objects with stored calculated locations within the field of view of the digital imaging camera.

21. The handheld targeting device of claim 20, further comprising a data communications link operable to emit the plurality of calculated locations of the plurality of objects to a remote computer server.

22. The handheld targeting device of claim 21, wherein the data communications link is further operable to receive calculated locations of other objects; and wherein the controller is further operable to:
  store the received calculated locations of the other objects; and
  overlay on the display of the visible-light image graphical indications of any of the other objects with stored calculated locations within the field of view of the digital imaging camera.

23. The handheld targeting device of claim 19, wherein the controller is further operable to display on the display of the visible-light image on the display a graphical indication of the second pulsed laser beam received by the laser spot tracker.

24. The handheld targeting device of claim 23, wherein the laser spot tracker is further operable to receive other second pulsed laser beams emitted by other laser target markers; and
  wherein the controller is further operable to display on the display of the visible-light image on the display a graphical indication of the other second pulsed laser beams.

25. The handheld device of claim 19, further comprising a user input operable to receive user selections of modes of operation, and wherein the controller is further operable to selectively operate one or more of the laser rangefinder, the infrared pointer, the laser target marker, and the laser spot tracker in response to the received user selections.

26. A targeting device, comprising;
  a housing that includes a first end and a second end;
  a self-location module arranged in the housing;
  a digital magnetic compass arranged in the housing;
  a laser rangefinder arranged in the housing;
  a laser targeting marker arranged in the housing and operable to emit a second pulsed laser beam;
  a laser spot tracker arranged in the housing and operable to receive the second pulsed laser beam emitted by the laser target marker;
  infrared pointer arranged in the housing and operable to emit an infrared beam;
  a digital imaging camera arranged in the housing;
  a first lens arranged at the first end of the housing and configured to transmit visible light to the digital camera;
  a display screen arranged at the second end of the housing; and
  computer memory in communication with a controller arranged in the housing and operable to:
    display on the display screen visible-light images captured by the digital imaging camera;
    determine a location of an object targeted by the laser rangefinder by:
      receiving a location of the housing from the self-location module;
      receiving a compass direction from the digital magnetic compass when the laser rangefinder emits a first pulsed laser beam; and
      calculating a location of the object, based on the received location of the housing, the received compass direction, and a calculated distance from the laser rangefinder; and after determining the location of the object, overlay on a displayed visible-light image a graphical indication of the object when the calculated location of the object is within a field of view of the digital imaging camera, wherein the first end includes six apertures:

a first aperture housing the first lens for the digital imaging camera;

a second aperture housing a second lens for a thermal imager and the laser rangefinder;

a third aperture through which the first pulsed laser beam passes;

a fourth aperture through which the second pulsed laser beam passes;

a fifth aperture through with the infrared beam passes; and a sixth aperture in communication with the laser spot tracker.

27. The targeting device of claim 26, wherein the controller is further operable to store a plurality of calculated locations for a plurality of objects, and overlay on the display of the visible-light image on the display graphical indications of any of the plurality of objects with stored calculated locations within a field of view of the digital imaging camera.

28. The targeting device of claim 27, further comprising a data communications link operable to emit the plurality of calculated locations of the plurality of objects to a remote computer server.

29. The targeting device of claim 28, wherein the data communications link is further operable to receive calculated locations of other objects; and wherein the controller is further operable to:

store the received calculated locations of the other objects; and overlay on the display of the visible-light image graphical indications of any of the other objects with stored calculated locations within the field of view of the digital imaging camera.

30. The targeting device of claim 26, wherein the controller is further operable to display on the visible-light image on the display a graphical indication of the second pulsed laser beam.

31. The targeting device of claim 30, wherein the laser spot tracker is further operable to receive other second pulsed laser beams emitted by other laser target markers; and wherein the controller is further operable to display on the visible-light image on the display a graphical indication of the other second pulsed laser beams.

32. The targeting device of claim 31, wherein the laser spot tracker is further operable to detect codes in the other second pulsed laser beams, and wherein the controller is further operable to:

identify the other second pulsed laser beams as friendly based on the detected codes; and display a first graphical indication of other second pulsed laser beams identified as friendly.

33. The targeting device of claim 31, wherein the infrared pointer is aligned in the housing such that the infrared beam is emitted along a longitudinal axis of the housing; and a thermal imager arranged in the housing and operable to capture infrared images within a field of view of a lens of the thermal imager arranged in the first end of the housing, wherein a second optical axis of the thermal imager is aligned in the housing such that captured infrared-light images are aligned along the longitudinal axis, and wherein the controller is further operable to display the captured infrared images on the display screen.

34. The targeting device of claim 33, wherein the laser rangefinder uses the lens of the thermal imager to receive the first pulsed laser beam.

35. The targeting device of claim 33, further comprising a user input operable to receive user selections of modes of operation, and wherein the controller is further operable to selectively operate one or more of the laser rangefinder, the infrared pointer, the laser target marker, and the laser spot tracker in response to the received user selections.

36. The targeting device of claim 26, further comprising an elevation module operable to determine an elevation angle of a longitudinal axis of the housing, wherein the self-location module determines an altitude of the housing, and wherein the controller is further operable to calculate an altitude of the object targeted by the laser rangefinder based on the determined altitude of the housing, the determined elevation angle of the longitudinal axis, and the calculated distance from the laser rangefinder.

* * * * *

UNITED STATES PATENT AND TRADEMARK OFFICE
CERTIFICATE OF CORRECTION

PATENT NO. : 10,408,574 B2
APPLICATION NO. : 15/246127
DATED : September 10, 2019
INVENTOR(S) : Richard B. Guthrie et al.

Page 1 of 1

It is certified that error appears in the above-identified patent and that said Letters Patent is hereby corrected as shown below:

In the Claims

In Column 19, Line 51, in Claim 1, delete "through with" and insert -- through which --, therefor.

In Column 25, Line 17, in Claim 26, delete "through with" and insert -- through which --, therefor.

Signed and Sealed this
Tenth Day of December, 2019

Andrei Iancu
*Director of the United States Patent and Trademark Office*